United States Patent
Bilton et al.

(10) Patent No.: US 8,850,818 B2
(45) Date of Patent: Oct. 7, 2014

(54) SYSTEMS AND METHODS FOR GAS FUEL DELIVERY WITH HYDROCARBON REMOVAL UTILIZING ACTIVE PRESSURE CONTROL AND DEW POINT ANALYSIS

(75) Inventors: Timothy Russell Bilton, Simpsonville, SC (US); Daniel Martin Moss, Simpsonville, SC (US); Korey Frederic Rendo, Greenville, SC (US); Colin Wilkes, Anderson, SC (US)

(73) Assignee: General Electric Company, Schenectady, NY (US)

( * ) Notice: Subject to any disclaimer, the term of this patent is extended or adjusted under 35 U.S.C. 154(b) by 1025 days.

(21) Appl. No.: 12/906,558

(22) Filed: Oct. 18, 2010

(65) Prior Publication Data
US 2012/0090331 A1    Apr. 19, 2012

(51) Int. Cl.
F02C 1/00 (2006.01)
F02G 3/00 (2006.01)
F02C 9/00 (2006.01)
F23K 5/00 (2006.01)
F02C 3/22 (2006.01)
F02C 7/22 (2006.01)
F02C 9/40 (2006.01)
F23N 1/00 (2006.01)

(52) U.S. Cl.
CPC . F02C 7/22 (2013.01); F23N 1/002 (2013.01); F23K 2401/201 (2013.01); F05D 2270/303 (2013.01); F23N 2021/10 (2013.01); F23K 5/00 (2013.01); F02C 3/22 (2013.01); F05D 2270/301 (2013.01); F02C 9/40 (2013.01)
USPC ............... 60/734; 60/39.281; 60/39.24

(58) Field of Classification Search
CPC ................... F02C 9/26; F02C 7/22
USPC ................ 60/734, 39.281
See application file for complete search history.

(56) References Cited

U.S. PATENT DOCUMENTS

| | | | |
|---|---|---|---|
| 3,865,707 A * | 2/1975 | Sayles | 204/410 |
| 4,073,136 A * | 2/1978 | Symon | 60/39.281 |
| 4,932,213 A * | 6/1990 | Summers et al. | 62/619 |
| 5,606,858 A * | 3/1997 | Amir et al. | 60/648 |
| 5,819,524 A * | 10/1998 | Bosley et al. | 60/39.465 |
| 5,832,717 A * | 11/1998 | Halin | 60/39.281 |
| 5,899,073 A * | 5/1999 | Akimaru | 60/736 |
| 6,082,092 A * | 7/2000 | Vandervort | 60/773 |
| 6,401,459 B1 * | 6/2002 | Tiras | 60/772 |
| 6,820,427 B2 * | 11/2004 | Wilkes | 60/772 |
| 6,901,735 B2 * | 6/2005 | Lohn | 60/39.465 |
| 7,047,747 B2 * | 5/2006 | Tanaka | 60/773 |

(Continued)

OTHER PUBLICATIONS

U.S. Appl. No. 12/512,527, filed Jul. 30, 2009.

Primary Examiner — William H Rodriguez
Assistant Examiner — Rene Ford
(74) Attorney, Agent, or Firm — Sutherland, Asbill & Brennan LLP

(57) ABSTRACT

Systems and methods for supplying fuel to a gas turbine are described. A fuel may be received, and one or more parameters associated with the received fuel may be determined. Based at least in part upon the determined one or more parameters, a desired pressure for removing one or more liquids from the fuel utilizing a separator may be calculated. The operation of a pressure changing device may then be controlled in order to achieve the desired pressure. In certain embodiments, the operations of the method may be performed by a controller that includes one or more computers.

18 Claims, 6 Drawing Sheets

(56) References Cited

U.S. PATENT DOCUMENTS

| | | | |
|---|---|---|---|
| 7,055,395 B2 * | 6/2006 | Wilkes | 73/861 |
| 7,134,284 B2 * | 11/2006 | Lohn | 60/772 |
| 7,516,608 B2 * | 4/2009 | Hellat et al. | 60/39.465 |
| 7,708,943 B1 * | 5/2010 | Robinson et al. | 422/51 |
| 7,854,110 B2 * | 12/2010 | LaGrow et al. | 60/39.281 |
| 7,966,802 B2 * | 6/2011 | Szepek et al. | 60/39.281 |
| 2009/0199477 A1 * | 8/2009 | McClanahan et al. | 48/198.1 |
| 2011/0023491 A1 * | 2/2011 | Rendo et al. | 60/734 |

* cited by examiner

SYSTEMS AND METHODS FOR GAS FUEL DELIVERY WITH HYDROCARBON REMOVAL UTILIZING ACTIVE PRESSURE CONTROL AND DEW POINT ANALYSIS

FIELD OF THE INVENTION

Embodiments of the invention relate generally to gas turbines and more specifically to gas turbine fuel systems.

BACKGROUND OF THE INVENTION

Gas turbines are widely used in a variety of commercial operations, such as power generation operations. Gas turbines generally include a compressor, one or more combustors, and a turbine component. Typically, the compressor progressively compresses a working fluid and discharges the compressed working fluid to the combustors. The combustors inject fuel into the flow of compressed working fluid and ignite the mixture to produce combustion gases having a relatively high temperature, pressure, and velocity. The combustion gases exit the combustors and flow to the turbine component where they expand to produce work which may be converted into electrical power.

Liquids forming within the condensed fuel gases may produce serious detrimental effects in the combustors, thereby resulting in hardware damage. Accordingly, conventional fuel suppliers typically provide relatively strict controls to reduce the moisture content of the fuel. However, these conventional fuel supplies typically require additional processing components to ensure that the fuel provided to the combustors is essentially free of liquids.

FIG. 1 shows a simplified diagram of a conventional fuel system 10 for supplying fuel to a gas turbine 12. The fuel system 10 generally includes a supply of fuel 14 having a pressure of approximately 400-700 pounds per square inch. At a given pressure, the fuel may be wet saturated (defined as having a temperature below the hydrocarbon dew point), dry saturated (defined as having a temperature equal to the hydrocarbon dew point), or superheated (defined as having a temperature above the hydrocarbon dew point). The fuel flows through a separator 16, and the separator 16 removes any condensed fluids (e.g., water, condensed hydrocarbons, etc.) from the fuel. A flow control valve 18 throttles the flow of fuel to the combustors of the gas turbine 12. As the fuel expands through the flow control valve 18, the Joule-Thomson effect causes a decrease in the temperature of the fuel. The expansion of the fuel may cause the fuel temperature to fall below the hydrocarbon dew point, allowing condensate to form. To prevent the fuel temperature from falling below the hydrocarbon dew point, the conventional fuel system 10 typically includes one or more heat exchangers 20, 22 upstream of the flow control valve 18. The heat exchangers 20, 22 add heat to the fuel to superheat the fuel and ensure that the fuel temperature remains above the hydrocarbon dew point at all times during the expansion.

FIG. 2 provides a graphical representation of the temperature and pressure changes in the fuel as it moves through the conventional fuel system 10 of FIG. 1. For purposes of illustration, FIG. 2 illustrates the fuel entering the fuel system as superheated fuel, indicated by point A. The heat exchangers 20, 22 heat the fuel to increase the fuel temperature to point B. As the fuel expands through the flow control valve 18, the Joule-Thomson effect reduces the temperature of the fuel from point B to point C. Notably, the gas expansion path from point B to point C remains above the hydrocarbon dew point at all times, preventing condensation in the fuel. The distance between points A and B represents an amount of superheat provided by the heat exchangers 20, 22 to ensure the fuel temperature remains above the hydrocarbon dew point at all times to prevent condensation.

Within conventional fuel system, multiple heat exchangers are typically necessary to ensure that an adequate heat source is available during all levels of operation. For example, during normal operations, the gas turbine 12 may supply the necessary heat. Hot compressed working fluid from the compressor or high temperature exhaust gases from the turbine may be extracted and supplied to one heat exchanger 22 to adequately superheat the fuel. However, during startup operations, heat is not readily available from the gas turbine 12, thus requiring a second heat exchanger 20 with an independent heat source 24.

The need for a second heat exchanger with an independent heat source to supply heat during start up operations requires additional capital costs in the construction of the gas turbine system. In addition, the second heat exchanger typically uses heating coils, an indirect fired heater, a heat pump, or similar devices for providing heat that consumes additional power or fuel during the start up that is typically in scarce supply. Moreover, the power consumed by the second heat exchanger to superheat the fuel decreases the overall efficiency of the gas turbine plant.

BRIEF DESCRIPTION OF THE INVENTION

Some or all of the above needs and/or problems may be addressed by certain embodiments of the invention. Embodiments of the invention may include systems and methods for supplying fuel to a gas turbine. According to one embodiment of the invention, there is disclosed a system for supplying fuel to a gas turbine. The system may include at least one flow channel configured to provide fuel; one or more sensing devices configured to determine one or more parameters associated with the fuel; a pressure changing device configured to receive the fuel from the at least one flow channel and reduce a pressure of the fuel to a desired pressure; and a separator connected downstream of the pressure changing device and configured to remove liquids from the fuel. Additionally, the system may include at least one controller configured to (i) receive the determined one or more parameters from the one or more sensing devices, (ii) calculate, based at least in part upon the one or more parameters, the desired pressure, and (iii) direct the operation of the pressure changing device to achieve the desired pressure.

According to another embodiment of the invention, there is disclosed a method for supplying fuel to a gas turbine. A fuel may be received, and one or more parameters associated with the received fuel may be determined. Based at least in part upon the determined one or more parameters, a desired pressure for removing one or more liquids from the fuel utilizing a separator may be calculated. The operation of a pressure changing device may then be controlled in order to achieve the desired pressure. In certain embodiments, the operations of the method may be performed by a controller that includes one or more computers.

According to yet another embodiment of the invention, there is disclosed a method for supplying fuel to a gas turbine. A fuel may be received, and a composition of the received fuel may be determined. Based at least in part upon the composition, a condensate concentration to pressure ratio for the fuel along an expansion path associated with the fuel may be determined. Based at least in part upon the calculated condensate concentration to pressure ratio, a desired pressure for removing one or more liquids from the fuel utilizing a separator may be calculated. The operation of a pressure changing device may then be controlled in order to achieve the desired pressure. In certain embodiments, the operations of the method may be performed by a controller that includes one or more computers.

Additional systems, methods, apparatus, features, and aspects are realized through the techniques of various embodiments of the invention. Other embodiments and aspects of the invention are described in detail herein and are considered a part of the claimed invention. Other embodiments and aspects can be understood with reference to the description and the drawings.

BRIEF DESCRIPTION OF THE DRAWINGS

Figure 1:
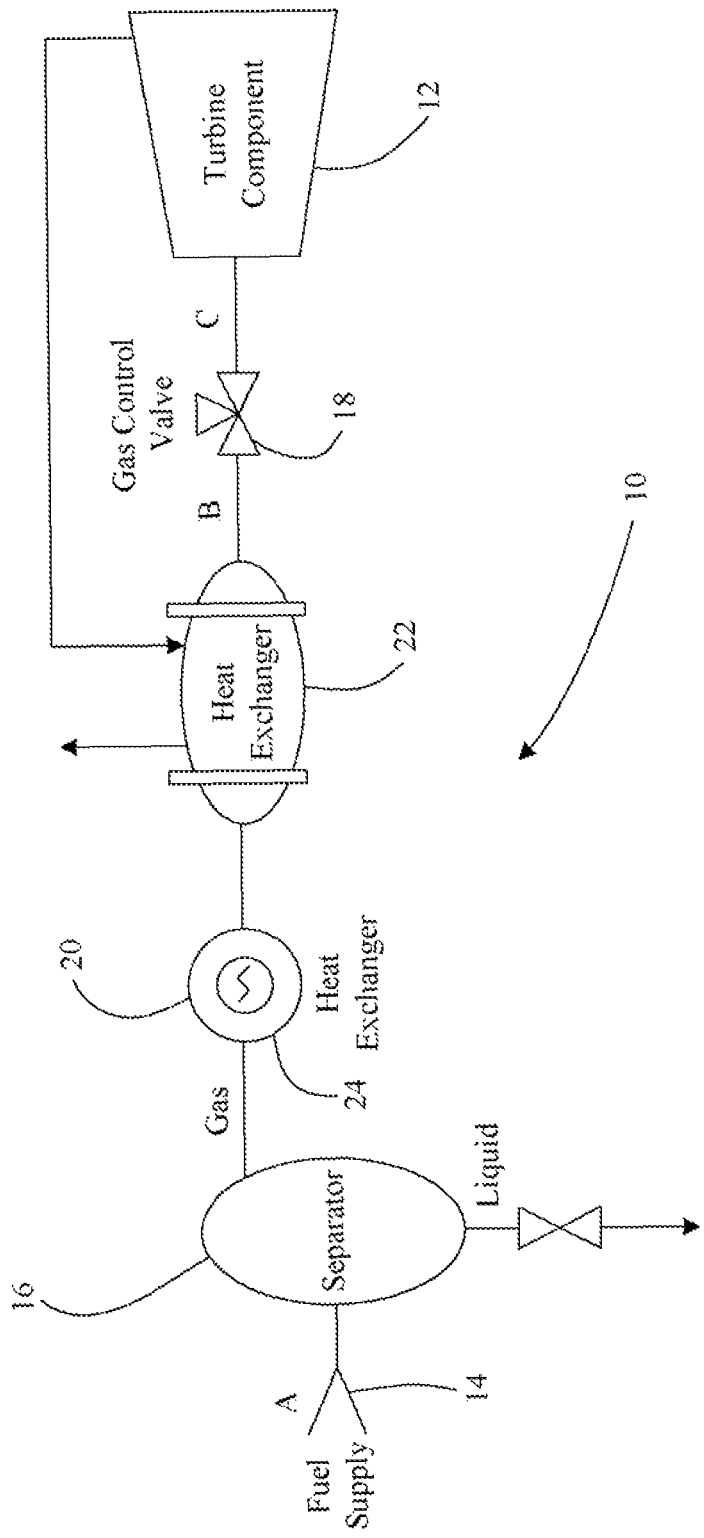

Having thus described the invention in general terms, reference will now be made to the accompanying drawings, which are not necessarily drawn to scale, and wherein:

FIG. 1 is a block diagram of a conventional example system that provides fuel to a gas turbine.

Figure 2:
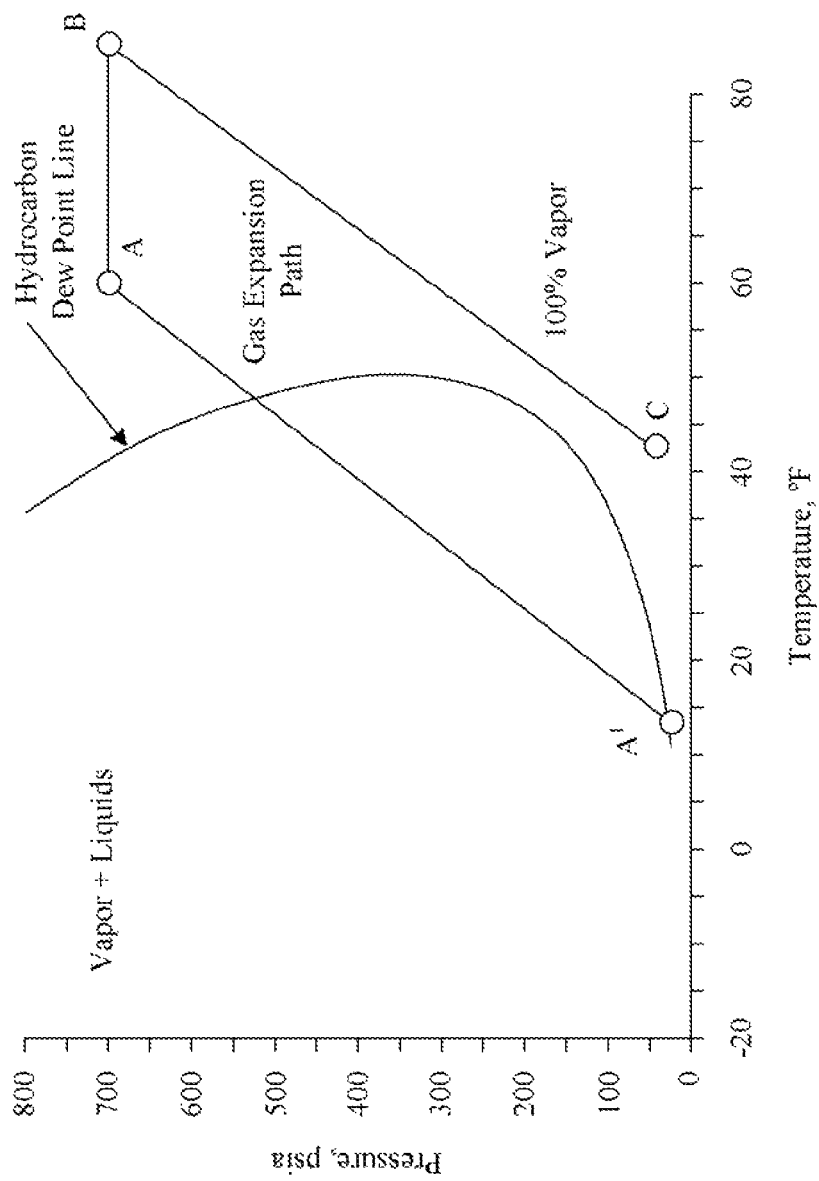

FIG. 2 is a graphical representation of the pressure and temperature of the fuel supplied in FIG. 1.

Figure 3:
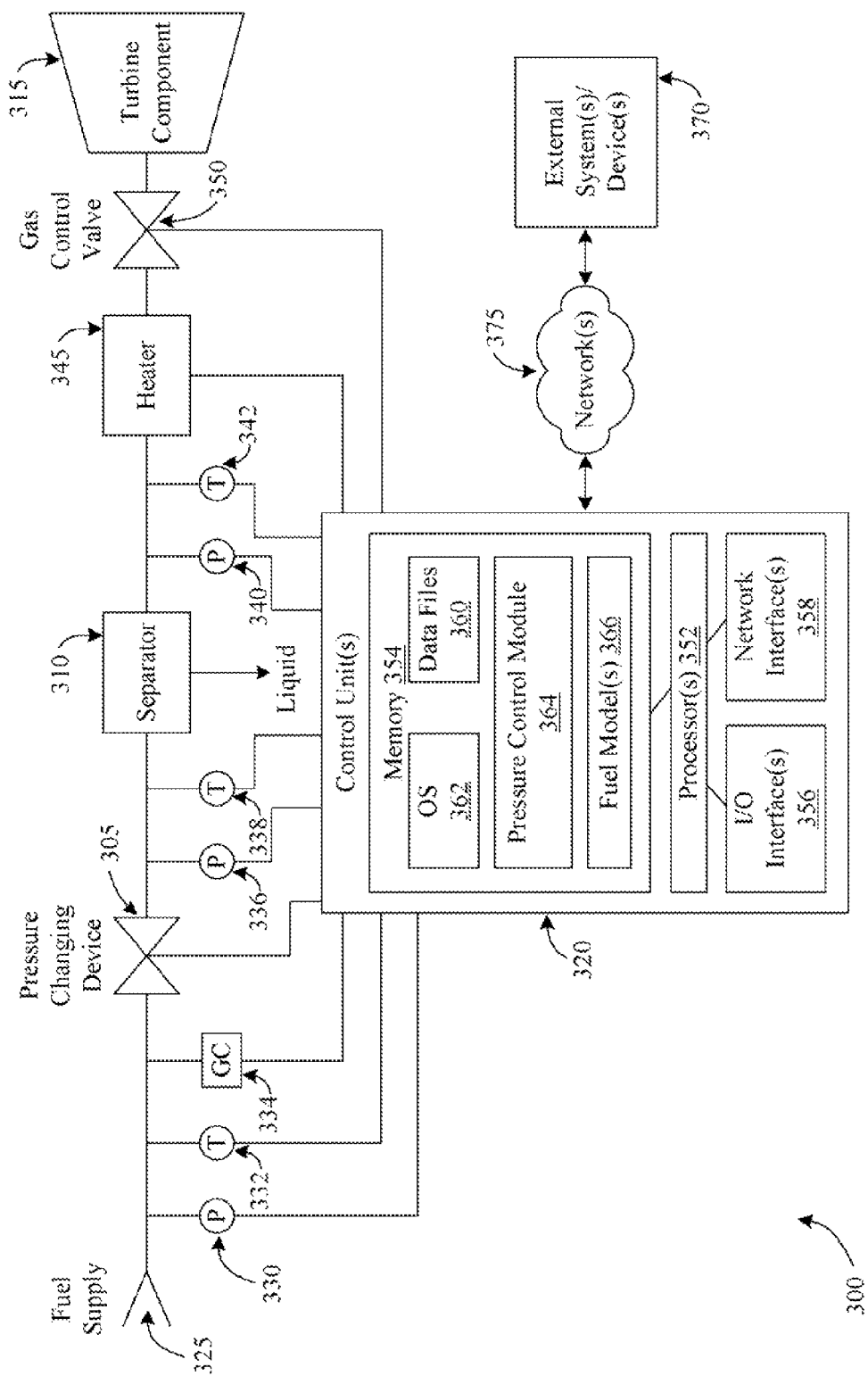

FIG. 3 is a block diagram of an example system that may be utilized to supply fuel to a gas turbine, according to an illustrative embodiment of the invention.

Figure 4:
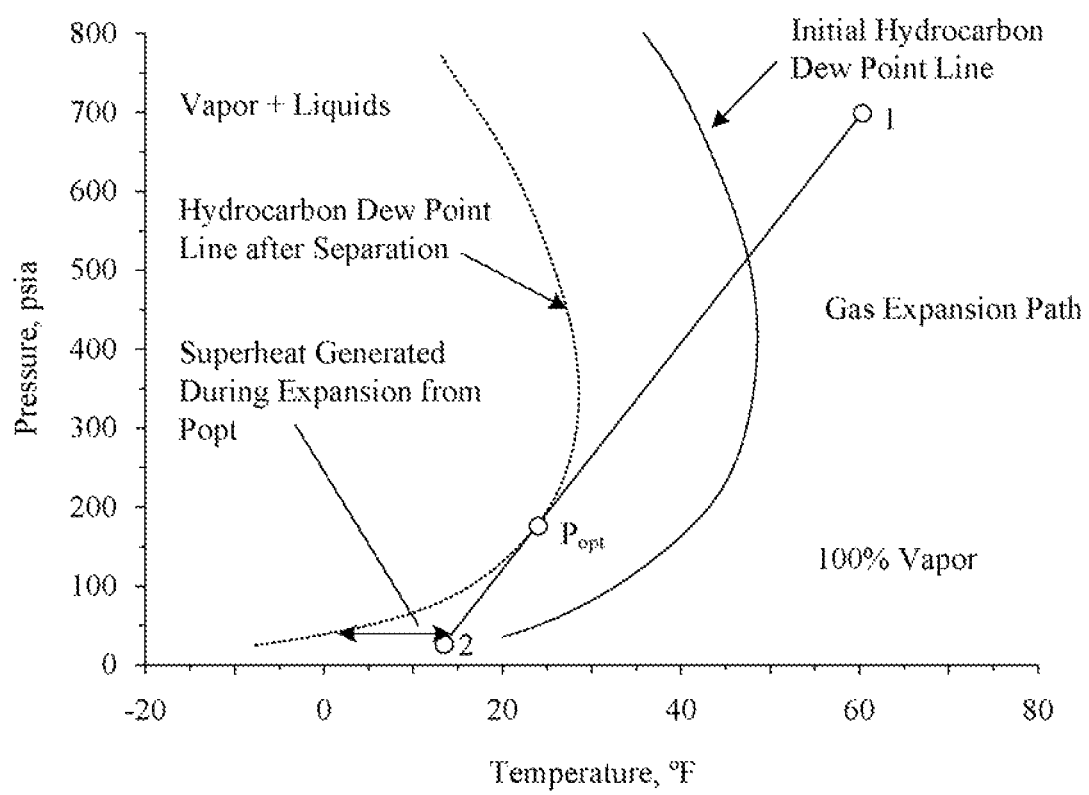
Figure 4:
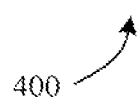

FIG. 4 is a graphical representation of the pressure and temperature of the fuel that may be supplied by fuel systems in accordance with various embodiments of the invention.

Figure 5:
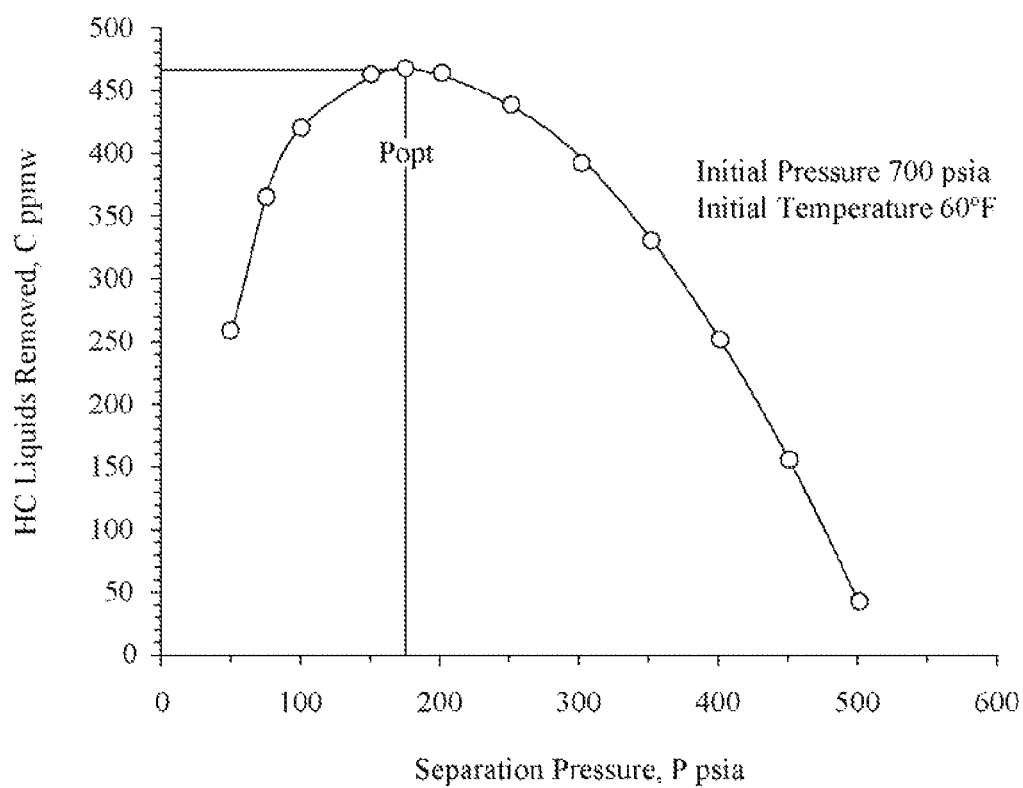

FIG. 5 is a graphical representation of an example condensate concentration to pressure ratio of a fuel, according to an illustrative embodiment of the invention.

Figure 6:
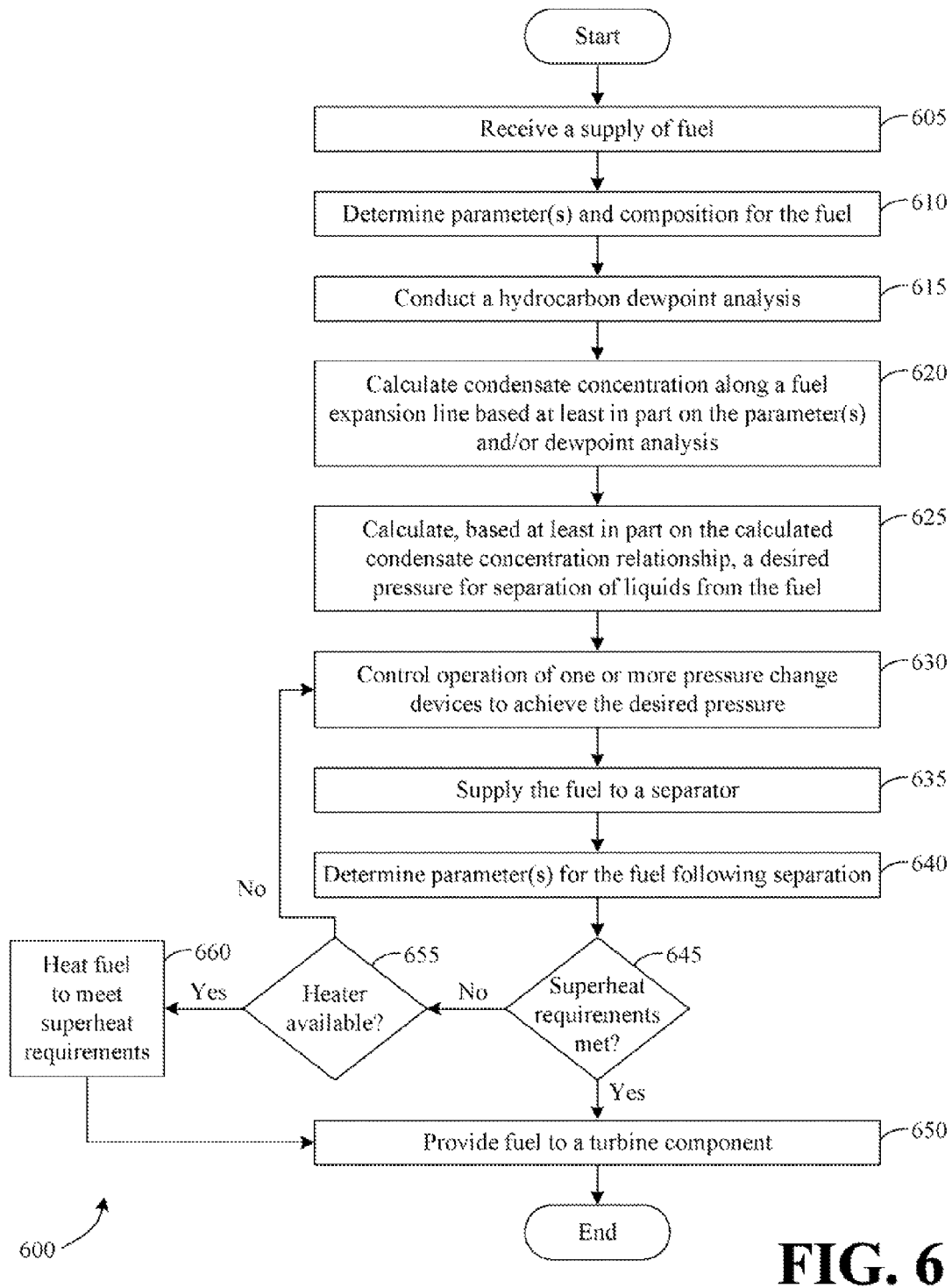

FIG. 6 is a flow diagram of an example method for supplying fuel to a gas turbine, according to an illustrative embodiment of the invention.

DETAILED DESCRIPTION OF THE INVENTION

Illustrative embodiments of the invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Disclosed are systems and methods for supplying fuel to a gas turbine. According to an example embodiment of the invention, a supply of fuel may be received, and characteristics and/or parameters associated with the fuel may be determined. For example, a composition of the fuel may be determined utilizing a gas chromatograph or other suitable device. As another example, a pressure and/or temperature of the fuel may be measured. Based upon the characteristics and/or parameters of the fuel, a desired pressure for removing liquids and/or condensates from the fuel may be determined. The operation of a pressure changing device, such as one or more valves and/or variable orifices, may then be controlled in order to achieve the desired pressure for the fuel. As desired, the pressure of the fuel may be monitored downstream of the pressure changing device, and the monitoring may be utilized to adjust the operation of the pressure changing device. Once the desired pressure has been achieved, the fuel may be passed through a separator, such as a separator that includes a coalescing filter, inertial separator, mist eliminator, an absorption tower, and/or another other suitable structure that is configured to remove liquids and/or condensates from the fuel. The fuel may then be provided to a turbine component, such as a combustor section of a gas turbine.

In certain embodiments, the composition of the fuel may be utilized to determine, calculate, conduct, or perform a hydrocarbon dew point analysis for the fuel. The hydrocarbon dew point analysis may indicate one or more points, such as pressure and temperature points, at which condensates within the fuel will begin to change from a gaseous state to a liquid state. Based at least in part upon the hydrocarbon dew point analysis, a condensate concentration to pressure ratio for the fuel may be identified. For example, the dew point analysis may be utilized to identify an expansion coefficient for the fuel. The expansion coefficient may then be utilized to determine, calculate, or estimate the condensate concentration within the fuel along a Joule-Thomson expansion line of the fuel (i.e., a line that indicates the correspondence between pressure and temperature for the fuel). A desired or optimal pressure for removing liquids and/or condensates from the fuel may then be determined based at least in part on the condensate concentration to pressure ratio. For example, a least squares fit for the condensate concentration to pressure ratio may be identified utilizing a suitable transfer function, and the transfer function may be differentiated in order to identify the desired pressure.

Various embodiments of the invention may include one or more special purpose computers, systems, and/or particular machines that facilitate the supply of fuel to a gas turbine. A special purpose computer or particular machine may include a wide variety of different software modules and/or applications as desired in various embodiments. As explained in greater detail below, in certain embodiments, these various software components may be utilized to identify a desired pressure for removing liquids and/or condensates from fuel utilizing a separator prior to providing the fuel to a gas turbine.

Certain embodiments of the invention described herein may have the technical effect of identifying a desired pressure for removing liquids and/or condensates from fuel prior to the fuel being provided to a gas turbine. In this regard, the supply of fuel to a gas turbine may be controlled, and damage to turbine components attributable to liquids and/or condensates in the fuel may be reduced and/or avoided. Additionally, hardware cost savings may be achieved and plant efficiency may be improved as the number of heating devices and/or heat exchangers required for the fuel supply system may be reduced.

FIG. 3 is a block diagram of one example system 300 that may be utilized to supply fuel to a gas turbine, according to an illustrative embodiment of the invention. The fuel supply system 300 illustrated in FIG. 3 may include at least a pressure changing device 305 configured to reduce or otherwise adjust the pressure of a fuel supply to a desired pressure and a separator 310 configured to remove liquids and/or condensates from the fuel prior to the fuel being supplied to a turbine component 315, such as one or more combustors associated with a gas turbine. Additionally, the fuel supply system 300 may include one or more suitable control units 320 configured to monitor the fuel supply system 300, determine a desired pressure for removing liquids and/or condensates from the fuel, and/or directing operation of the pressure changing device 305.

With continued reference to FIG. 3, a fuel supply 325 may be provided. For example, the fuel supply 325 may include suitable piping and/or flow channels configured to transfer a supply of fuel from a fuel source to the fuel supply system 300 of FIG. 3. The supply of fuel may be any fuel suitable for combustion in a gas turbine, such as blast furnace gas, coke oven gas, natural gas, vaporized liquefied natural gas ("LNG"), propane, etc. In various embodiments of the invention, the temperature, pressure, and/or composition of the fuel may vary. For example, the fuel may include a wide variety of different components, such as various impurities. Additionally, in various embodiments, the fuel may be delivered as wet saturated fuel (i.e., having a temperature below the hydrocarbon dew point), dry saturated fuel (i.e., having a temperature equal to the hydrocarbon dew point), or superheated fuel (i.e., having a temperature above the hydrocarbon dew point).

The pressure changing device 305 or pressure changing devices may be connected downstream of the fuel supply 325. The pressure changing device(s) 305 may include any number of components and/or devices that facilitate the reduction and/or other manipulation of a pressure of the supplied fuel. For example, the pressure changing device 305 may include one or more Joule-Thomson valves, pressure reducing valves, throttle valves, variable orifices, or any valves through which a gas is allowed to expand adiabatically, resulting in lowering of its temperature due to the Joule-Thomson effect. As desired, one or more bypass valves may be used in conjunction with the pressure changing device 305 to extend the maximum operational flow range as needed. In operation, the fuel flows to the pressure changing device 305 via suitable piping and/or flow channels, and the pressure changing device 305 reduces the pressure of the fuel to a desired pressure that facilitates the removal of liquids and/or condensates from the fuel. In certain embodiments, operation of the pressure changing device 305 is controlled and/or directed by the control unit(s) 320. For example, as explained in greater detail below, the control unit(s) 320 may determine a desired pressure and direct a positioning or other operation of a suitable pressure control valve or other pressure changing device 305 in order to achieve the desired pressure. According to an aspect of the invention, the desired pressure may be a pressure that facilitates an efficient and/or maximum removal of liquids and/or condensates from the fuel utilizing the separator 310.

In typical applications, the pressure of a supplied fuel may be in a range of approximately four hundred (400) to approximately seven hundred (700) pounds per square inch ("psi"). Accordingly, the pressure of the fuel will typically be reduced in order to achieve a desired pressure. However, in certain embodiments, the pressure of received fuel may be below a desired pressure. Accordingly, as desired, any number of compressors and/or other devices that facilitate an increase in the pressure of the fuel to a desired pressure may be utilized in accordance with various embodiments of the invention.

According to an aspect of the invention, one or more characteristics and/or parameters associated with the fuel may be measured, identified, and/or otherwise determined prior to the fuel being supplied to the pressure changing device 305. A wide variety of characteristics and/or parameters may be determined as desired in various embodiments of the invention, such as a pressure of the fuel, a temperature of the fuel, and/or a composition of the fuel. With reference to FIG. 3, any number of sensors, sensing devices, and/or measurement devices may be provided. The sensors may be configured to measure various parameters associated with the fuel and/or to analyze the composition of the fuel. For example, a suitable pressure sensor 330 or pressure transmitter may be provided to measure a pressure of the fuel and a suitable temperature sensor 332 or temperature transmitter may be provided to measure a temperature of the fuel. As another example, a suitable gas composition determination device, such as a gas chromatograph 334, may be provided. The gas chromatograph 334 may take a sample of the fuel, and analyze the sample in order to identify a composition of the fuel. In other words, the gas chromatograph 334 may conduct an analysis that identifies the various components of the fuel. The measurements data taken by and/or the calculations made by the sensing devices 330, 332, 334 may be provided to the control unit(s) 320 and utilized by the control unit(s) 320 to determine a desired pressure for removing liquids and/or condensates from the fuel.

Additionally, in certain embodiments, various parameters and/or characteristics of the fuel may be measured at other points within the system 300, such as downstream of the pressure changing device 305 and/or downstream of the separator 310. The control unit(s) 320 may receive at least a portion of these measurements and utilize the measurements data to dynamically adjust the operation of the pressure changing device 305, to determine whether the fuel may be provided to the turbine component 315, and/or to determine whether the fuel should be heated prior to being provided to the turbine component 315. As shown in FIG. 3, a suitable pressure sensor 336 and/or temperature sensor 338 may be provided and utilized to measure a pressure and/or temperature of the fuel downstream of the pressure changing device 305. Similarly, a suitable pressure sensor 340 and/or temperature sensor 342 may be provided and utilized to measure a pressure and/or temperature of the fuel downstream of the separator 310.

With continued reference to FIG. 3, the separator 310 may be configured to remove liquids and/or condensates that are present in the fuel after the fuel has passed through the pressure changing device 305. For example, the separator 310 may be configured to remove liquids and/or condensates that are present in a wet saturated or dry saturated fuel. A wide variety of different types of separators 310 may be utilized as desired in various embodiments of the invention. In certain embodiments the separator 310 may include a coalescing filter, an inertial separator, a mist eliminator, and/or other components that facilitate the physical separation of gases and liquids. In other embodiments, the separator 310 may include an absorption tower having an absorbent oil that removes liquid fuel and/or moisture from the fuel stream. The separator 310 may discharge the liquids and/or condensates through a suitable liquid port for recycling or further use in the fuel system. In accordance with an aspect of the invention, gaseous fuel flows out of the separator 310 as a dry saturated fuel (i.e., at the hydrocarbon dew point) or superheated fuel (i.e., above the hydrocarbon dew point).

In certain embodiments of the invention, one or more heating devices 345, such as one or more heat exchangers, may optionally be provided downstream of the separator 310. If present, a heating device 345 may provide heat to the fuel after it has passed through the separator 310. In this regard, the heating device 345 may ensure that the fuel is superheated (i.e., at a temperature above a hydrocarbon dew point) prior to the fuel being provided to the turbine component 315. Due to the relatively low temperature of the fuel following expansion through the pressure changing device 305, the heating device 345 typically does not require a high temperature heat source to increase the temperature of the fuel to above the hydrocarbon dew point. One example of a suitable heating device 345 is a heat exchanger that utilizes a geothermal heat source, steam from an auxiliary boiler, and/or another suitable heat source.

As desired in certain embodiments of the invention, one or more control valves 350 or other suitable devices that control fuel flow may be connected downstream of the separator 310 and, if present, heating device 345. The control valve 350 may control the flow of fuel to the gas turbine component 315. A wide variety of suitable control valves 350 may be utilized as desired, such as a Joule-Thomson valve, a throttle valve, a variable orifice, or similar device known to one of ordinary skill in the art for regulating fluid flow. Additionally, the control valve 350 may alter and/or control the pressure of the fuel utilizing a wide variety of techniques as desired in various embodiments of the invention. For example, during the start up of the gas turbine, the control valve 350 may further reduce the pressure of the fuel to between approximately 25 and 50 pounds per square inch, depending on the start up needs of the gas turbine. The fuel pressure may gradually be increased as load is applied to the gas turbine, and the control valve may be adjusted accordingly. At some point, the gas turbine may be operating at a sufficient level to allow the extraction of hot compressed working fluid from the compressor or high temperature exhaust gases from the turbine to provide additional superheat to the fuel.

With continued reference to FIG. 3, the fuel supply system 300 may include one or more control units 320 or control devices. For purposes of this disclosure, a single control unit 320 will be described. In certain embodiments, a control unit 320 may be a component of a central controller associated with a power plant and/or power generation system. Some examples of suitable controllers are a Mark™ VI control system and a Mark™ VIe control system produced by the General Electric Company. According to an aspect of the invention, the control unit 320 may be configured to control the supply of fuel to a gas turbine. As desired, the control unit 320 may control the operations of other components of the system 300. For example, the control unit 320 may receive measurements and/or calculations from any number of the sensors 330, 332, 334, 336, 338, 340, 342. The control unit 320 may process received measurements data and, as desired, provide measurements data to one or more additional systems and/or models. Based upon an analysis of the measurements data and/or output of one or more additional systems, the control unit 320 may calculate or determine a desired pressure for removing liquids and/or condensates from the fuel. Based at least in part upon the calculated desired pressure, the control unit 320 may control operation of the pressure changing device 305, heater 345, and/or control valve 350. As desired, control of various components of the system 300 may be distributed among several control units.

The control unit 320 may include any number of suitable processor driven devices. For example, the control unit 320 may include any number of special purpose computers or particular machines, application-specific circuits, programmable logic controllers ("PLC"), microcontrollers, personal computers, minicomputers, mainframe computers, supercomputers, and the like. In certain embodiments, the operations of the control unit 320 may be controlled by computer-executed or computer-implemented instructions that are executed by one or more processors associated with the control unit 320. The instructions may be embodied in one or more software components as desired in various embodiments of the invention. The execution of the instructions may form a special purpose computer or other particular machine that is operable to control the supply of fuel to one or more gas turbine components 315. The one or more processors that control the operations of the control unit 320 may be incorporated into the control unit 320 and/or in communication with the control unit 320 via one or more suitable networks.

The control unit 320 may include one or more processors 352, one or more memory devices 354, one or more input/output ("I/O") interfaces 356, and/or one or more network interface devices 358. The one or more memory devices 354 may be any suitable memory devices, for example, caches, read-only memory devices, random access memory devices, magnetic storage devices, etc. The one or more memory devices 354 may store data, executable instructions, and/or various program modules utilized by the control unit 320, for example, data files 360 associated with the operation of the gas turbine and/or other components of the system 300, an operating system ("OS") 362, a pressure control module 364, and one or more fuel models 366. The data files 360 may include any suitable data associated with the operation of the gas turbine and/or the supply of fuel to the gas turbine, such as various measurements data received from the sensors, calculated or identified composition data for the fuel, condensate concentration to pressure ratio information for the fuel, dew point analysis information for the fuel, etc. The OS 362 may include executable instructions and/or program modules that facilitate and/or control the general operation of the control unit 320. For example, the OS 362 may facilitate the execution of other software programs and/or program modules by the processors 352, such as the pressure control module 364 and/or the fuel models 366.

The pressure control module 364 or pressure control application may be a suitable software module that facilitates a determination of a desired pressure for removing liquids and/or condensates from the fuel. In operation the pressure control module 364 may determine or identify various parameters of the fuel that is supplied to the system 300, for example, by obtaining measurements data and/or fuel composition data from the pressure sensor 330, temperature sensor 332, and chromatograph 334. The pressure control module 364 may then calculate the desired pressure based at least in part upon the received parameters.

A wide variety of suitable techniques may be utilized as desired to calculate the desired pressure. For example, the composition of the fuel may be utilized to determine, calculate, conduct, or perform a hydrocarbon dew point analysis of the fuel and/or to generate a hydrocarbon dew point curve for the fuel. In certain embodiments, the pressure control module 364 may invoke one or more modeling systems and/or modeling applications in order to conduct the hydrocarbon dew point analysis. For example, the pressure control module 364 may invoke one or more fuel models 366 that are executed by one or more control units 320. As another example, the pressure control module 364 may invoke one or more models that are stored on and/or executed by one or more external systems or devices 370 in communication with the control unit 320 via one or more suitable networks 375. A wide variety of suitable modeling software and/or modeling programs may be utilized to conduct a dew point analysis, such as Aspen HYSIS, which is a product offered by Aspen Technology, Inc. In certain embodiments, a modeling program may receive fuel composition information and utilize the composition information to conduct a dew point analysis for the fuel. As a result of the dew point analysis, a Joule-Thomson coefficient or gas expansion coefficient may be calculated or determined.

Once a hydrocarbon dew point analysis has been conducted and/or a Joule-Thomson coefficient has been identified, the pressure control module 364 may utilize the results of the hydrocarbon dew point analysis and/or the Joule-Thomson coefficient to calculate the desired pressure. For example, in certain embodiments, the Joule-Thomson coefficient may be utilized to calculate or determine a condensate concentration for the fuel at various temperatures, such as temperatures along a fuel expansion line for the fuel. Once the condensate concentration analysis has been performed, the condensate concentration analysis may be utilized to calculate the desired pressure. In one example, embodiment, the desired pressure may be a pressure that results in a relatively high or a maximum condensate concentration. In this regard, superheat may be added to the fuel by removing liquids and/or condensates. A wide variety of techniques and/or calculations may be utilized to determine a desired pressure based at least in part upon a condensate concentration analysis. For example, a suitable transfer function and a least squares fit analysis may be applied to the condensate concentration to pressure ratio data, and the desired pressure may be calculated by differentiating the transfer function and solving for pressure.

Once a desired pressure is determined, the pressure control module 364 may direct or control operation of the pressure changing device 305 in order to achieve the desired pressure within the fuel flow. For example, the pressure control module 364 may control the positioning and/or actuation of one or more pressure valves and/or variable orifices in order to achieve the desired pressure. In certain embodiments, the pressure control module 364 may receive pressure and/or temperature measurements data associated with the fuel flow downstream of the pressure changing device 305, and the pressure control module 364 may evaluate the measurements data in order to dynamically adjust operation of the pressure changing device 305 to achieve the desired pressure. As one example, measurements received from the pressure sensor 336 and/or temperature sensor 338 downstream of the pressure changing device 305 may be evaluated in order to determine whether desired superheat conditions have been met and, as desired, operation of the pressure changing device 305 may be altered based upon the evaluation.

Additionally, in certain embodiments, the pressure control module 364 may receive pressure and/or temperature measurements data associated with the fuel flow downstream of the separator 310, and the pressure control module 364 may evaluate the measurements data in order to determine whether additional superheat should be added to the fuel. As one example, measurements received from the pressure sensor 340 and/or temperature sensor 342 downstream of the separator 310 may be evaluated in order to determine whether desired superheat conditions have been met and, as desired, the pressure control module 364 may direct the heating device 345 to heat the fuel prior to the fuel being provided to the gas turbine. One example of the operations that may be performed by the pressure control module 364 is set forth in greater detail below with reference to FIG. 6.

With continued reference to FIG. 3, the network interface devices 358 may facilitate connection of the control unit 320 to any number of suitable networks, such as a local area network, a wide area network, the Internet, a radio frequency ("RF") network, a Bluetooth™ enabled network (trademark owned by BLUETOOTH SIG, INC.), any suitable wired network, any suitable wireless network, or any suitable combination of wired and wireless networks. In this regard, the control unit 320 may communicate with other components of the system 300 and/or with external devices or systems. The I/O interfaces 356 may facilitate communication between the control unit 320 and one or more input/output devices, for example, one or more user interface devices, such as a display, keypad, control panel, touch screen display, remote control, microphone, etc., that facilitate user interaction with the control unit 320.

As desired, embodiments of the invention may include a system 300 with more or less than the components illustrated in FIG. 3. The system 300 of FIG. 3 is provided by way of example only.

FIG. 4 is a graphical representation 400 of the pressure and temperature of the fuel that may be supplied by fuel systems in accordance with various embodiments of the invention. For example, FIG. 4 is a representation 400 of fuel that may be supplied by the fuel system 300 of FIG. 3. The fuel entering the fuel system 300 may be wet saturated fuel (i.e., below the hydrocarbon dew point), dry saturated fuel (i.e., at the hydrocarbon dew point), or superheated fuel (i.e., above the hydrocarbon dew point). For purposes of illustration, FIG. 4 illustrates the fuel entering the fuel system 300 as superheated fuel, as indicated at point one (1).

In accordance with an aspect of the invention, a desired pressure for removing liquids and/or condensates from the fuel has been calculated. The pressure changing device 305 may receive the supply of fuel and reduce the pressure and temperature of the fuel until the fuel reaches the desired pressure, illustrated as point $P_{opt}$. FIG. 4 illustrates the fuel exiting the pressure changing device 305 as being wet saturated fuel. The fuel then passes through the separator 310, and liquids and/or condensates may be removed from the fuel. In this regard, a hydrocarbon dew point line of the fuel may be shifted from an initial dew point line to a dew point line following separation. Accordingly, the gaseous fuel flowing out of the separator 310 may be dry saturated (i.e., at the hydrocarbon dew point) or superheated (i.e., above the hydrocarbon dew point) fuel. For purposes of illustration, FIG. 4 illustrates the fuel exiting the separator 310 as dry saturated fuel, as indicated by point $P_{opt}$ being on the dashed curve for the new hydrocarbon dew point.

The fuel may then flow through the control valve 350 which further reduces the temperature and pressure of the gaseous fuel, as indicated by the line $P_{opt}$-2, creating superheat as the gas expansion path deviates from the new hydrocarbon dew point curve. This occurs because the change in temperature with respect to the change in pressure ($\Delta T/\Delta P$) created by the control valve 350 may have a greater slope than the new hydrocarbon dew point curve. Accordingly, the fuel supplied to the gas turbine may be superheated fuel. The distance between the dew point line following separation and point 2 represents an amount of superheat added to the fuel as a result of the removal of liquids and/or condensates.

FIG. 5 is a graphical representation 500 of an example condensate concentration to pressure ratio of a fuel, according to an illustrative embodiment of the invention. The representation 500 illustrates the concentration of liquids and/or condensates within the fuel over a range of pressure values for the fuel. For example, the representation 500 illustrates the concentration of liquids and/or condensates as the fuel expands from an initial pressure of approximately 700 psia and an initial temperature of approximately sixty degrees Fahrenheit. Utilizing the graphical representation 500, a desired pressure (indicated as $P_{opt}$) for removing liquids and/or condensates from the fuel may be identified. For example, the desired pressure may be a point at which a maximum concentration of condensates is formed within the fuel.

In certain embodiments, the representation 500 illustrated in FIG. 5 may be generated based upon the composition of the fuel. For example, the composition of the fuel may be utilized to perform a dew point analysis for the fuel, and the dew point analysis may be evaluated in order to calculate or determine a Joule-Thomson coefficient for the fuel. The Joule-Thomson coefficient may then be utilized to calculate quantities of hydrocarbon condensate formed within the fuel along various points of an expansion line for the fuel, such as the expansion line illustrated in FIG. 4 between points 1 and 2.

FIG. 6 is a flow diagram of an example method 600 for supplying fuel to a gas turbine, according to an illustrative embodiment of the invention. The method 600 may be performed by a suitable control unit associated with a fuel supply system, such as the control unit 320 associated with the fuel supply system 300 illustrated in FIG. 3. The method 300 may begin at block 605.

At block 605, a supply of fuel may be received. Various parameters of the fuel may then be determined at block 610. A wide variety of parameters associated with the supplied fuel may be determined as desired, such as a temperature of the fuel and a pressure of the fuel. According to an aspect of the invention, a composition of the fuel may also be determined at block 610. For example, the fuel may be analyzed by a gas chromatograph that identifies the composition of the fuel. One example of the composition of a natural gas fuel that is illustrated in Table 1 below:

TABLE 1

Example Gas Fuel Composition Analysis

| Component | Mole Fraction |
|---|---|
| CO2 | 0.015000 |
| Argon | 0.000012 |
| Nitrogen | 0.006610 |
| Methane | 0.958191 |
| Ethane | 0.014866 |
| Propane | 0.002866 |
| i-Butane | 0.000449 |
| n-Butane | 0.000593 |
| 22-Mpropane | 0.000013 |
| i-Pentane | 0.000181 |
| n-Pentane | 0.000155 |
| 22-Mbutane | 0.000482 |
| 23-Mbutane | 0.000048 |
| 3-Mpentane | 0.000040 |
| n-Hexane | 0.000062 |
| 24-Mpentane | 0.000032 |
| Benzene | 0.000010 |
| Cyclohexane | 0.000033 |
| 2M1C6= | 0.000013 |
| 23-Mpentane | 0.000008 |
| 3-Epentane | 0.000006 |
| n-Heptane | 0.000027 |
| 25-Mhexane | 0.000005 |
| 3M1C6= | 0.000002 |
| Toluene | 0.000026 |
| 2-Mheptane | 0.000001 |
| n-Octane | 0.000051 |
| n-Decane | 0.000068 |
| H2O | 0.000147 |

The composition analysis illustrated in Table 1 is provided by way of example only. A wide variety of different composition analyses may be constructed, identified and/or generated based upon a sample of a supplied fuel.

At block 615, a hydrocarbon dew point analysis may be determined, calculated, conducted, or performed for the fuel based at least in part upon the determined fuel composition. In certain embodiments, one or more fuel modeling systems may be utilized to conduct the hydrocarbon dew point analysis. An example of a hydrocarbon dew point curve that may be generated from a fuel composition is illustrated in FIG. 4. As desired, the hydrocarbon dew point analysis may be utilized to determine a Joule-Thomson coefficient or expansion coefficient for the fuel, which may be referred to using the symbol $K_0$. $K_0$ may be a constant that is utilized in an equation that represents the adiabatic gas expansion path across a pressure changing device, and may be expressed as a linear function of pressure by equation one (1) below:

$$T_2 = T_1 + (P_1 - P_2) \cdot K_0 \quad (1)$$

With reference to equation (1), $T_1$ may represent an initial temperature of the fuel, $T_2$ may represent a final temperature of the fuel, $P_1$ may represent an initial pressure of the fuel, $P_2$ may represent a final pressure of the fuel, and $K_0$ may by the Joule-Thomson coefficient. $K_0$ may be negative for many fuel compounds, such as natural gas. Accordingly, a temperature drop may occur during an expansion of the fuel. $K_0$ may be calculated from the gas composition and may be a function of the initial temperature. With the fuel composition provided in Table 1 above, the value of $K_0$ may be calculated as 0.069.

At block 620, a condensate concentration for the fuel may be calculated along an expansion line of the fuel based at least in part upon the conducted dew point analysis and/or other parameters associated with the fuel. For example, a condensate concentration to pressure ratio for the fuel may be calculated or determined utilizing a calculated value of $K_0$. As desired, a condensate concentration may be calculated at a wide variety of pressures along the expansion line of the fuel. As one example, a suitable control system or other system may utilize equation (2) below to calculate condensate concentration for the fuel at various pressures. An example of a condensate concentration analysis is illustrated in FIG. 5.

At block 625, a desired pressure (which may be referred to an optimal pressure) for separating liquids and/or condensates from the fuel may be calculated based at least in part on the calculated condensate concentration to pressure relationship or ratio. A wide variety of techniques may be utilized to determine the desired pressure. For example, a maximum condensate concentration value may be identified, and the pressure associated with that value may be determined. As another example, a transfer function may be generated for and/or applied to the condensate concentration to pressure ratio, and the transfer function may be differentiated and solved for pressure. A wide variety of suitable transfer functions may be utilized as desired in various embodiments of the invention, such as the transfer function set forth in equation (2) below:

$$C = K_1 + K_2 \cdot P + K_3 \cdot P^2 + \frac{K_4}{P} \quad (2)$$

With reference to equation (2), the parameter C may represent the hydrocarbon condensate concentration in parts per million by weight ("ppmw"). $K_1$, $K_2$, $K_3$, and $K_4$ may be constants that are based upon or determined based upon a least squares fit analysis of the condensate concentration to pressure ratio. The parameter P may represent the pressure of the fuel. For the ratio illustrated in FIG. 5, example values for $K_1$, $K_2$, $K_3$, and $K_4$ may be:

$K_1 = 408.8084$
$K_2 = 0.221672$
$K_3 = -0.00323$
$K_4 = -28301.9$

The desired pressure may be calculated by differentiating equation (2) and setting the result to zero (0), as illustrated by equation (3) below.

$$\frac{\partial C}{\partial P} = K_2 + 2 \cdot K_3 \cdot P - \frac{K_4}{P^2} = 0 \quad (3)$$

Solving for pressure (P) utilizing the least squares constants may result in the calculation of the desired pressure. Using the values of the constants set forth above, the desired pressure may be calculated as 176 pounds per square inch absolute ("psia"), and the corresponding hydrocarbon concentration may be 187 ppmw. By adjusting the pressure of the fuel to 176 psia prior to providing the fuel to separator, a relatively maximum rate of condensate removal may be achieved, thereby ensuring that the fuel will be superheated when it is further expanded. The calculations and values set forth above are provided by way of example only. It will be appreciated that similar calculations may be conducted for other initial fuel conditions and compositions.

At block 630, operation of a pressure changing device, such as one or more Joule-Thomson valves, may be controlled in order to achieve the desired pressure. For example, a positioning of the valves may be set and/or controlled in order to reduce the pressure of the fuel to the desired pressure. As desired, the pressure and/or temperature of the fuel may be measured and/or monitored downstream of the pressure changing device. In this regard, operation of the pressure changing device may be dynamically adjusted based upon downstream measurements until the desired pressure is achieved.

At block 635, the fuel that has been expanded through the pressure changing device may be supplied to a separator, such as a coalescing filter or an absorption tower having an absorbent oil. In this regard, liquids and/or condensates may be removed from the fuel. By removing liquids and/or condensates from the fuel, the hydrocarbon dew point line for the fuel may be shifted. Accordingly, when the fuel is further expanded by a control valve prior to being supplied to a turbine component (e.g., a combustor), the fuel may be superheated.

At block 640, which may be optional in certain embodiments of the invention, one or more parameters for the fuel may be determined or measured following the separation of liquids and/or condensates from the fuel. For example, the pressure and/or temperature of the fuel may be measured downstream of the separator. At block 645, a determination may be made as to whether superheat requirements for the fuel have been met. In other words, a determination may be made as to whether the fuel is likely to include any liquids and/or condensates when it is further expanded and/or provided to a gas turbine component. If it is determined at block 645 that the superheat requirements for the fuel have been met, then the fuel may be provided to the gas turbine component. If, however, it is determined at block 645 that the superheat requirements for the fuel have not been met, then operations may continue at block 655.

At block 655, a determination may be made as to whether a heater device (e.g., a heat exchanger) is available to heat the fuel. If it is determined at block 655 that a heater device is not available, then the fuel may not be supplied to the turbine component. Operations may return to block 630, and operation of the pressure reduction device may be adjusted and/or otherwise controlled to achieve a desired pressure to remove condensates from the fuel. If, however, it is determined at block 655 that a heater device is available, then operations may continue at block 660, and the fuel may be heated by the heater device in order to meet superheat requirements for the fuel. The fuel may then be supplied to the gas turbine component at block 650.

The method 600 may end following block 650.

The operations described in the method 600 of FIG. 6 do not necessarily have to be performed in the order set forth in FIG. 6, but instead may be performed in any suitable order. Additionally, in certain embodiments of the invention, more or less than all of the elements or operations set forth in FIG. 6 may be performed.

The invention is described above with reference to block and flow diagrams of systems, methods, apparatuses, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general purpose computer, a special-purpose computer, a processor, or other programmable data processing apparatus to produce a particular machine, such that the instructions that execute on the computer, processor, or other programmable data processing apparatus create means for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special purpose hardware and computer instructions.

While the invention has been described in connection with what is presently considered to be the most practical and various embodiments, it is to be understood that the invention is not to be limited to the disclosed embodiments, but on the contrary, is intended to cover various modifications and equivalent arrangements included within the scope of the appended claims.

This written description uses examples to disclose the invention, including the best mode, and also to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system for supplying fuel to a gas turbine, the system comprising:
at least one flow channel configured to provide a fuel;
one or more sensing devices configured to determine one or more parameters associated with the fuel, wherein the determined one or more parameters comprise a composition of the fuel;
a pressure changing device configured to receive the fuel from the at least one flow channel and reduce a pressure of the fuel to a desired pressure;
a separator connected downstream of the pressure changing device and configured to remove liquids from the fuel; and
at least one controller configured to (i) receive the determined one or more parameters from the one or more sensing devices, (ii) calculate, based at least in part upon the one or more parameters, the desired pressure, wherein the at least one controller is configured to calculate the desired pressure by: directing, based at least in part on the composition, a calculation of a hydrocarbon dew point analysis for the fuel; identifying, based at least in part on the hydrocarbon dew point analysis, a condensate concentration to pressure ratio for the fuel along an expansion path associated with the fuel; and calculating the desired pressure based at least in part upon the calculated condensate concentration to pressure ratio; and (iii) direct the operation of the pressure changing device to achieve the desired pressure.

2. The system of claim 1, wherein the one or more sensing devices comprise at least one of (i) a pressure sensor, (ii) a temperature sensor, or (iii) a fuel composition analysis device.

3. The system of claim 1, wherein the one or more sensing devices comprise a gas chromatograph.

4. The system of claim 1, wherein the at least one controller is further configured to invoke a modeling component to calculate the hydrocarbon dew point analysis.

5. The system of claim 1, wherein the at least one controller is further configured to calculate the desired pressure by:
identifying a least squares fit for the calculated condensate concentration to pressure ratio utilizing a transfer function; and
calculating the desired pressure based at least in part on differentiating the transfer function.

6. The system of claim 5, wherein the transfer function comprises a transfer function of $C=K_1+(K_2*P)+(K_3*P^2)+(K_4/P)$, wherein C is the hydrocarbon condensate concentration, P is the pressure of the fuel, and $K_1$, $K_2$, $K_3$, and $K_4$ are least squares fit constants.

7. The system of claim 1, wherein the pressure changing device comprises at least one of (i) a Joule-Thomson valve or (ii) a variable orifice.

8. The system of claim 1, wherein the at least one controller is configured to control the operation of the pressure changing device by:
monitoring a pressure of the fuel downstream of the pressure changing device;
comparing the monitored pressure to the desired pressure; and
controlling the operation of the pressure changing device based at least in part upon the comparison.

9. The system of claim 1, wherein the separator comprises at least one of (i) a coalescing filter, (ii) an inertial separator, (iii) a mist eliminator, or (iv) an absorption tower having an absorbent oil.

10. A method for supplying fuel to a gas turbine, the method comprising:
receiving a fuel;
determining, by a controller comprising one or more computers, one or more parameters associated with the received fuel, wherein the determined one or more parameters comprise a composition of the fuel;
calculating, by the controller based at least in part upon the determined one or more parameters, a desired pressure for removing one or more liquids from the fuel utilizing a separator, wherein calculating a desired pressure comprises:
determining a hydrocarbon dew point analysis for the fuel based as least in part on the composition;
calculating, based at least in part on the hydrocarbon dew point analysis, a condensate concentration to pressure ratio for the fuel along an expansion path associated with the fuel; and
calculating the desired pressure based at least in part upon the calculated condensate concentration to pressure ratio; and
controlling, by the controller, the operation of a pressure changing device to achieve the desired pressure.

11. The method of claim 10, wherein determining one or more parameters associated with the received fuel comprises determining at least one of (i) a temperature of the fuel, (ii) a pressure of the fuel, or (iii) a composition of the fuel.

12. The method of claim 10, wherein determining a hydrocarbon dew point analysis comprises determining a hydrocarbon dew point analysis by modeling the fuel based at least in part on the composition.

13. The method of claim 10, wherein calculating the desired pressure comprises:
identifying a least squares fit for the calculated condensate concentration to pressure ratio utilizing a transfer function; and
calculating the desired pressure based at least in part on differentiating the transfer function.

14. The method of claim 13, wherein identifying a least squares fit utilizing a transfer function comprises identifying a least squares fit utilizing the transfer function of $C=K_1+(K_2*P)+(K_3*P^2)+(K_4/P)$, wherein C is the hydrocarbon condensate concentration, P is the pressure of the fuel, and $K_1$, $K_2$, $K_3$, and $K_4$ are least squares fit constants.

15. The method of claim 10, wherein controlling the operation of a pressure changing device comprises controlling the operation of at least one of (i) a Joule-Thomson valve or (ii) a variable orifice.

16. The method of claim 10, wherein controlling the operation of a pressure changing device to achieve the desired pressure comprises:
monitoring a pressure of the fuel downstream of the pressure changing device;
comparing the monitored pressure to the desired pressure; and
controlling the operation of the pressure changing device based at least in part upon the comparison.

17. A method for supplying fuel to a gas turbine, the method comprising:
receiving a fuel;
determining a composition of the fuel;
determining, by a controller comprising one or more computers and based at least in part upon the composition, a condensate concentration to pressure ratio for the fuel along an expansion path associated with the fuel;
calculating, by the controller based at least in part upon the calculated condensate concentration to pressure ratio, a desired pressure for removing one or more liquids from the fuel utilizing a separator; and controlling, by the controller, the operation of a pressure changing device to achieve the desired pressure.

18. The method of claim 17, wherein determining a composition of the fuel comprises analyzing the fuel with a gas chromatograph.

\* \* \* \* \*